United States Patent [19]

Parulski

[11] Patent Number: 4,876,590

[45] Date of Patent: Oct. 24, 1989

[54] LOW RESOLUTION VERIFIER FOR A STILL VIDEO IMAGE

[75] Inventor: Kenneth A. Parulski, Rochester, N.Y.

[73] Assignee: Eastman Kodak Company, Rochester, N.Y.

[21] Appl. No.: 208,303

[22] Filed: Jun. 17, 1988

[51] Int. Cl.[4] .......................... H04N 9/04; H04N 9/07
[52] U.S. Cl. ........................................... 358/41; 358/44
[58] Field of Search .............................. 358/41, 44, 43

[56] References Cited

U.S. PATENT DOCUMENTS

| | | | |
|---|---|---|---|
| 4,054,906 | 10/1977 | Yamanaka | 358/43 |
| 4,059,839 | 11/1976 | Yamanaka et al. | 358/44 |
| 4,117,510 | 9/1978 | Ohta et al. | 358/44 |
| 4,237,477 | 12/1980 | Weimer | 358/44 |
| 4,262,301 | 4/1981 | Erlichman | 358/6 |
| 4,293,871 | 10/1981 | Macovski | 358/44 |
| 4,404,585 | 9/1983 | Hjortzberg | 358/41 |
| 4,456,931 | 6/1984 | Toyoda et al. | 358/335 |
| 4,496,995 | 1/1985 | Collis et al. | 358/335 X |
| 4,500,913 | 2/1985 | Hashimoto et al. | 358/44 |
| 4,500,919 | 2/1985 | Schreiber | 358/78 |
| 4,532,558 | 7/1985 | Oota et al. | 358/906 X |
| 4,541,010 | 9/1985 | Alston | 358/44 |
| 4,571,627 | 2/1986 | Stempeck | 358/224 |
| 4,605,956 | 8/1986 | Cok | 358/44 |
| 4,652,909 | 3/1987 | Glenn | 358/41 |
| 4,663,661 | 5/1985 | Weldy et al. | 358/44 |
| 4,691,253 | 9/1987 | Silver | 358/906 X |
| 4,734,759 | 3/1988 | Kobori et al. | 358/44 X |
| 4,740,828 | 4/1988 | Kinoshita | 358/41 X |
| 4,758,883 | 7/1988 | Kawahara et al. | 358/41 X |

Primary Examiner—James J. Groody
Assistant Examiner—E. Anne Faris
Attorney, Agent, or Firm—David M. Woods

[57] ABSTRACT

Video imaging apparatus provides a relatively lower resolution verification image from a high resolution image sensor. By orienting a color filter array so that the luminance (green) elements are arranged in same-color stripes parallel to the horizontal scanning direction, the luminance elements may be subsampled for greater flexibility in generating the lower resolution image. A memory stores the discrete image signals from the image sensor and accesses the signals in two modes: a high resolution recording mode for addressing substantially all the image signals and a low resolution display mode for addressing only those signals from lines of same-color (green) filter elements. The low resolution addressing can be based on a variety of line sampling patterns corresponding to the line capability and horizontal resolution of a display device.

11 Claims, 2 Drawing Sheets

FIG. 2

LOW RESOLUTION VERIFIER FOR A STILL VIDEO IMAGE

BACKGROUND OF THE INVENTION

Cross-Reference to a Related Application

This application is related to Ser. No. 208,302, "Color Imaging Apparatus Employing a Horizontal Stripe Color Filter to Reduce Rise-Time Artifacts," filed on even date herewith in the name of Kenneth Parulski and assigned to the assignee of the present invention.

1. Field of the Invention

This invention is related to the field of color video recording and reproduction and, more particularly, to a video camera having a single, multi-color image sensor and a monochrome replay capability.

2. Description Relative to the Prior Art

U.S. Pat. No. 4,456,931 discloses an electronic camera having a monitor that can display the image signals before recording them in a memory. The monitor as disclosed processes whatever signals the camera generates which, for a high resolution image sensor, can represent more information than the monitor needs. On-camera monitoring can typically be accomplished with less than a high-quality, full resolution image. Indeed, a typical miniature image monitor for a camera can only produce a relatively lower resolution image. In U.S. Pat. No. 4,691,253, this limitation is accommodated by purposely processing only a low resolution representation of an image. The camera as disclosed is also capable of producing high resolution still images in digital format. A selected fraction of the digital composite image signal comprising the low resolution representation is directed to a mini-buffer memory. The signal from the mini-buffer memory is then displayed by an electronic CRT viewfinder.

U.S. Pat. No. 4,541,010 describes an electronic camera for recording still photographs at high resolution while allowing for low resolution preview compatible with the standard television frame rate. In this case, a special image sensor is required, which includes a high resolution sensing array separated from a smaller low resolution storing array by special shift registers. A sample of the high resolution image is transferred through the shift registers into the low resolution array for preview. The high resolution array is superposed by vertical color stripes, as follows (in part):

GRGBGRGBG

GRGBGRGBG

GRGBGRGBG

GRGBGRGBG

The preview image consists of image data from the columns of the image sensing array superposed by green filters—in particular, from pixels residing in every other column and in alternate rows. Consequently, the preview image consists of the low resolution array filled with monochrome, or luminance, samples. Since the high resolution samples are a line mixture of chrominance and luminance, it is necessary to have the special sensor structure (two arrays separated by shift registers) to rearrange the samples into lines of luminance.

SUMMARY OF THE INVENTION

If all the luminance-producing filter elements were oriented in the horizontal line direction, the signal output of the image sensor would, for such lines, be directly in luminance. A special image sensor would be unnecessary and the luminance signal from a subset of lines could, in one mode, be applied to a lower resolution display device. In another mode, the full resolution image comprising all of the lines of chrominance as well as of luminance could be recorded. In the lower resolution mode, the luminance-producing sensor element can be subsampled in a variety of patterns for greater flexibility in generating a lower resolution image corresponding to the line capability and horizontal resolution of a variety of display devices.

A family of color filter arrays that orient stripes of luminance (e.g, green) color in the high speed horizontal scan direction include the type of filters disclosed in the cross-referenced Ser. No. 208,302. This application describes the special case of a color filter array having a vertically repetitive pattern comprising at least two adjacent lines of same-color (e.g., green) filter elements oriented in the horizontal scanning direction and a line of filter elements including at least one other color (e.g., red or blue) also oriented in the horizontal scanning direction. Other filters having but one horizontal stripe of luminance separating red/green elements are also functional with the present invention.

In a general embodiment of the invention, a low-resolution image is generated from all or a portion of the luminance signals from the lines of same-color luminance filter elements. One way of doing this is to directly process the image signals from the sensor for display on the image monitor. In the preferred embodiment of the invention, instead of applying the subset of luminance lines directly to the display, the discrete signals from the image sensor are first stored in line sequence in a memory, that is, with complete lines of green preserved in the line scanning direction. The advantage is that the actual recorded picture can be easily verified. The memory is selectively addressed in either a high definition mode or a low definition mode. The high definition mode includes the addressing of substantially all image signals for recording while the low definition mode includes the addressing of all or fewer image signals from only the lines of same-color filter elements, e.g., green elements. The low definition addressing mode is used for generating a low resolution display either before or after recording the image signals.

BRIEF DESCRIPTION OF THE DRAWINGS

The prior art and the invention will be described in relation to the drawings, in which:

FIGS. 2(A) through 2(E) show other representations of horizontal stripe color filter arrays that are functional according to the invention.

DESCRIPTION OF THE PREFERRED EMBODIMENTS

Figure 1:
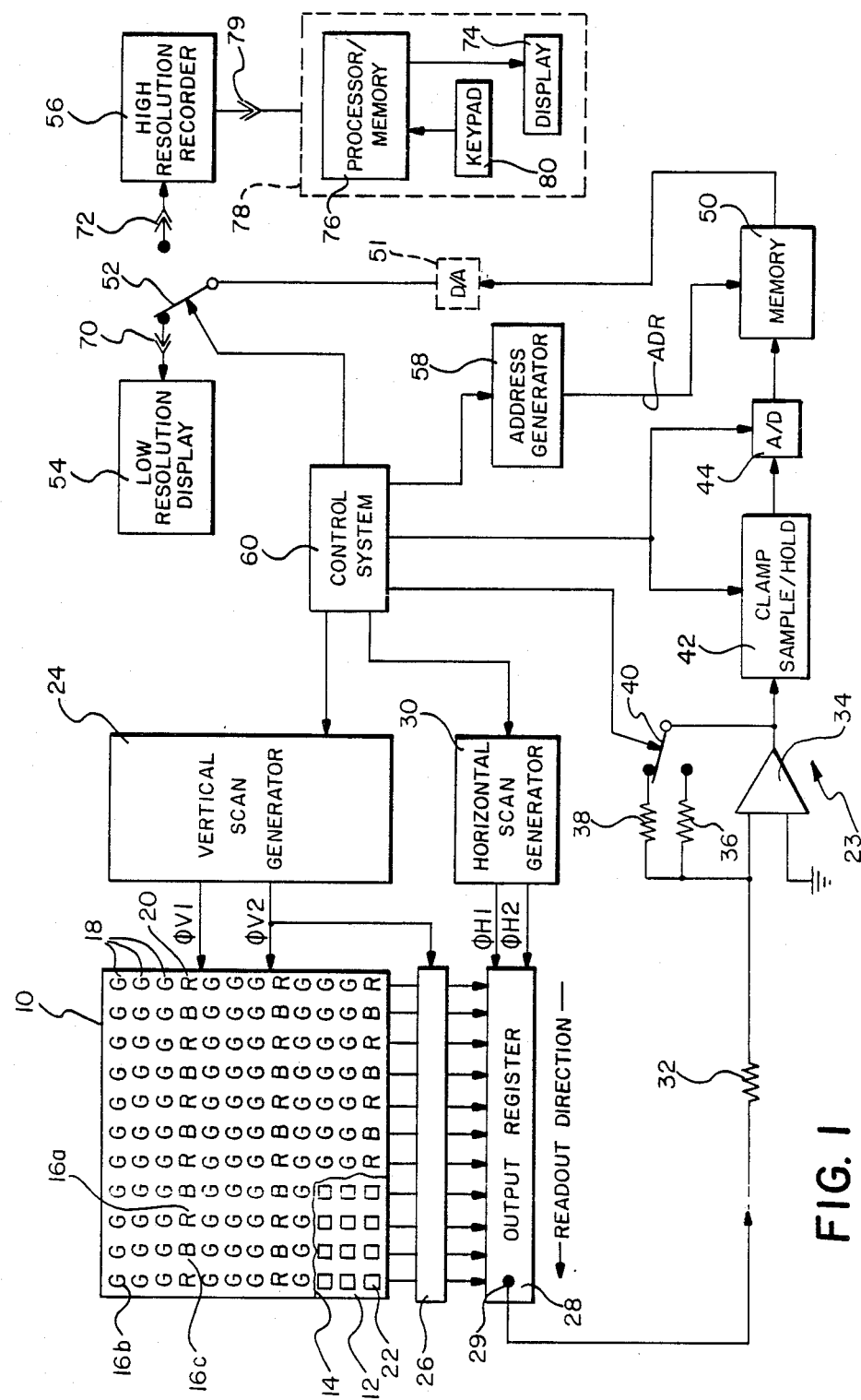
FIG. 1 shows a video imaging apparatus including an image sensor with a horizontal stripe color filter and a processing circuit for generating a low resolution display according to the invention.

Imaging apparatus employing a horizontal stripe color filter array and ancillary circuits for a low resolution display according to the invention is shown by FIG. 1. A color filter 10 is shown overlying a charge-coupled image sensor 12 (which is shown for illustration through a cut-away portion 14 of the color filter 10). The color filter 10 has a plurality of red, green and blue elements 16a, 16b, 16c arranged in vertically-repetitive sequences of three lines 18 of green elements and one line 20 of alternating red and blue elements. (This type of color filter, that is, with three adjacent green stripes, is used for reasons unique to the cross-referenced Ser. No. 208,302 that are unrelated to the present invention. As will be described in connection with FIG. 2, filters with one or two green stripes separating lines of other colors are also encompassed within the present invention.) The color filter elements 16a, 16b, 16c cover a plurality of photosites 22 on the sensor 12. Image light striking the sensor 12 is integrated at the photosites 22 according to the image-wise distribution of light intensity. The image sensor 12 is used in a still video imaging system in which image light is controlled by an optical shutter (not shown). The shutter is opened so that light strikes the image sensor for a limited period of time. After exposure the shutter is closed and the image charge in the sensor is read out to a signal processing network 23.

A vertical scan generator 24 generates clock phase signals $\phi V1$ and $\phi V2$ for controlling image integration and vertical transfer. The phase signals provide an array of potential wells (corresponding to the integration photosites 22) during the image integration time (when the shutter (not shown) is open), and subsequently transfer the discrete image charge and operate a transfer gate 26 during vertical readout. The discrete image charge is vertically transferred across the image sensor 12 by conventional two-phase complementary clocking of the phase signals $\phi V1$ and $\phi V2$. The readout proceeds with a vertical transfer of charge packets, an entire row at once, through the transfer gate 26 to a high-speed horizontal register 28. Meanwhile, a horizontal scan generator 30 is providing horizontal clock phase signals $\phi H1$ and $\phi H2$ to the horizontal output register 28. Discrete signal charge is clocked out of the horizontal output register via conventional two-phase complementary clocking of the phase signals $\phi H1$ and $\phi H2$. An output capacitative node 29 produces a signal which is amplified and processed in the signal processing circuit 23. An exemplary image sensor employing such clock signals is a 1320(H)×1035(V)-element full-frame CCD imager manufactured by Eastman Kodak Company, Rochester, N.Y. (part number KAF-1400). Such a high resolution image sensor typically requires the horizontal output register 28 to operate at greater than 10 MHz.

The line-by-line output signal from the output register 28 is applied through a resistor 32 to an inverting amplifier 34. The gain of the amplifier 34 is adjusted by switching between two resistances, a red/blue gain resistor 36 and a green gain resistor 38. A gain-selecting feedback switch 40 operates in synchronism with the line frequency, that is, in synchronism with the rate at which lines are transferred through the transfer gate 26 to the output register 28, which is typically less than 20 KHz. While in synchronism with the line frequency, the switch 40 need only switch from luminance to chrominance for every third line of green in the preferred embodiment (and back to luminance after every line of red/blue). The relative gains of green and red/blue lines are therefore equalized by switching the gain of the amplifier 34 on a line-by-line basis. As explained in the cross-reference Ser. No. 208,302, this adjustment is useful since green (luminance) is more critical to color balance than is red or blue (which means, as a practical matter, that a common gain can be used for red or blue, thus avoiding the need to switch on an element-by-element basis for the red/blue line 20). Two gain selections represent satisfactory equalization for a particular light source. Color balance for different light sources can be obtained by switching among further gain factors (not shown).

With the gain properly adjusted, the video signal is clamped and sampled by a clamp, sample and hold circuit 42 and a stream of discrete image signals is applied to an analog/digital converter 44. Digital image data is output by the A/D converter 44 to a memory 50 for temporary storage. The memory 50 has sufficient capacity for storing all of the discrete image signals from the image sensor 10. The output of the memory 50 is applied to a switch 52, which connects the stored image signals to either a low resolution display device 54 or to a high resolution recorder 56. (A digital to analog conversion, shown by the element 51 in broken line, may be necessary depending on the form of display and/or recording.) The display device 54 is a low resolution monochrome monitor such as a liquid crystal display or an electronic CRT viewfinder. Whatever the display device used, it does not utilize the full resolution provided by the image sensor 10. "Lower" resolution is a relative term, however, in that a standard NTSC line rate of 525 is lower than the 1035 lines provided by the preferred sensor. Thus the display device 54 may be displaying standard video line rates or, indeed, any line rate lower than that of the sensor. On the other hand, the high resolution recorder 56 may be a conventional data recorder, e.g., a disc or tape recorder and ancillary circuitry, that is capable of recording the full signal spectrum, whether analog or digital, of the image signals provided by the image sensor 10.

The discrete image signals stored in the memory 50 are addressed in two modes: a high resolution mode and a low resolution mode. The switch 52 input is correspondingly set to connect with either the high resolution recorder 56 or with the low resolution display 54 dependent upon the address mode. An address generator 58 generates high resolution addresses on the address line ADR in the high resolution mode to transfer all, or substantially all, of the image signals stored in the memory 50 to the high resolution recorder 56. In the low resolution mode, the address generator 58 provides low resolution addresses on the address line ADR for transferring all or a portion of the image signals derived from the green lines 18 stored in the memory 50 to the low resolution display 54.

A control system 60, which typically includes a microprocessor and high speed digital circuits, generally controls the vertical and horizontal scan generators 24 and 30, the gain switch 40, the clamp sample/hold circuit 42 and the A/D converter 44. In addition, the control system 60 responds to a user signal (not shown) or to a predetermined operating sequence for connecting the switch 52 input either to the high resolution recorder 56 or to the low resolution display 54. The control system 60 accordingly instructs the address generator 58 to deliver either the high resolution addresses or the low resolution addresses to the memory 50.

Figure 2:
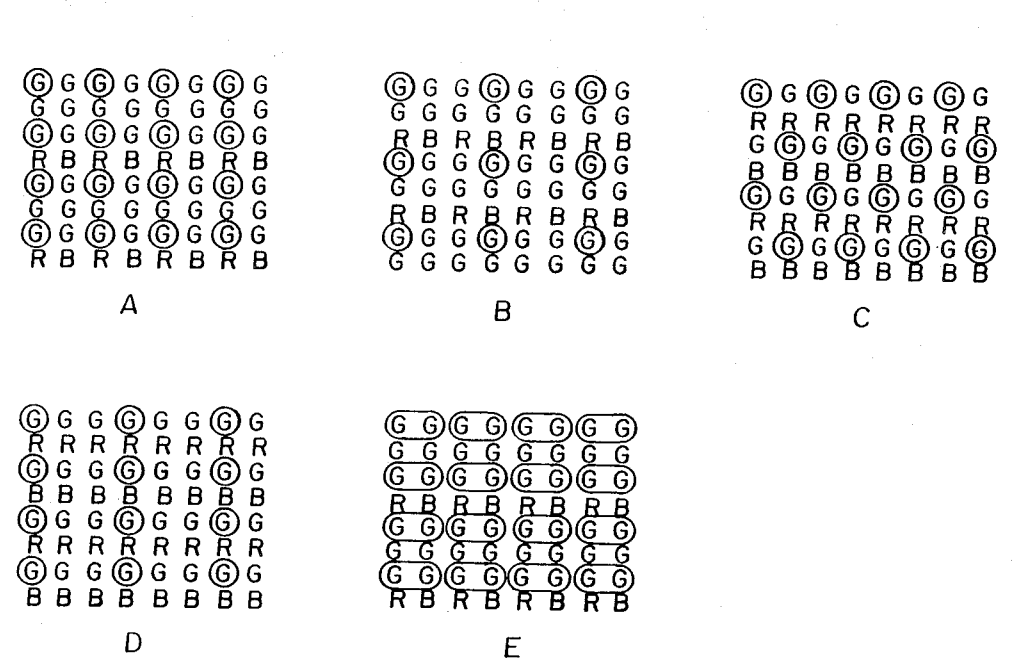

The high resolution addresses, as stated earlier, address effectively all of the image signal storage locations in the memory 50. In the preferred embodiment, the low resolution addresses access a subset of the luminance storage locations as represented by the green filter elements 16b in the green lines 18. The number of lines to be addressed depend on the number of vertical lines in the display device 54 just as the number of horizontal pixels to be addressed depends on the horizontal display resolution. Depending on such display requirements, numerous sample strategies for low resolution addressing are possible—FIG. 2 illustrates a few. FIG. 2(A) illustrates even sampling of the image signals, that is, the selection of samples from evenly-spaced columns and evenly-spaced rows. More particularly, FIG. 2(A) shows the selection of green image signals in every other column and row (the addressed image signals are indicated with circles over the corresponding color filter element). This sampling strategy is particularly useful with the preferred sensor (1035 lines) since it provides the approximate line rate of a conventional NTSC video signal. Of course, other even sampling strategies are possible, e.g., every fourth column and row, every sixth column and row, and so on.

FIG. 2(B) shows both a different filter array and an example of odd sampling of the image signals, that is, the selection of samples from oddly-spaced columns and oddly-spaced rows. A repeating pattern of two rows of green filter elements and a row of red/blue elements is shown in FIG. 2(B) as is sampling of every third column and third row. FIG. 2(B) is likewise representative of a family of oddly-spaced patterns, e.g., every fifth row and column, every seventh row and column, and so on. FIG. 2(C) shows a checkerboard sampling strategy for a color filter array comprising alternating stripes of green and either red or blue filter elements. FIGS. 2(C), (B) and (A) show that the invention may be implemented with color filter arrays including repetitive groupings of one, two or three green stripes, respectively. Greater numbers of green stripes, e.g., four, five and so on, are also possible. Green, which represents luminance, is the color used according to the invention for the low resolution display. Consequently, the chrominance color organization does not matter in relation to this invention. For example, FIGS. 2(A) and 2(B) show chrominance comprising alternating red and blue elements within each line; FIG. 2(C) shows alternating lines of red and blue.

FIG. 2(D) is representative of another family of sampling strategies involving image signals from oddly-spaced columns and evenly-spaced rows. The converse, which is not shown, is also possible, that is, signals from evenly-spaced columns and oddly spaced rows. FIG. 2(E) represents yet another sampling strategy, this time involving the averaging of adjacent green image signals from evenly-spaced rows. FIG. 2 is not intended to be exhaustive and many other patterns would clearly be within reach of the invention. Furthermore, the green filter elements may be replaced with other colors representative of luminance, such as: transparent together with yellow and cyan elements for chrominance; yellow together with magenta and cyan elements; or transparent with red and cyan elements.

As described in the copending cross referenced Ser. No. 208,302, the imaging apparatus employs the color filter array of FIG. 1 in order to use the improved form of signal processing described in connection with U.S. Pat. No. 4,663,661. Though forming no necessary part of the present invention, this processing is useful in generating an improved high resolution luminance signal. To do this, a video camera includes an optical blurring filter (not shown in the present figures) having a known spatial (or frequency) function. The color filter is interposed between the blurring filter and an image sensor. An accurate estimate of the green light blocked by the non-green elements of the filter is recovered by applying the image signal from the sensor to a digital filter (not shown) and substituting the resultant filter output for the missing green portions. The coefficients of the digital filter are selected in a special optimization process that is described in U.S. Pat. No. 4,663,661. The color filter provides an interpolation sequence for the digital filter of at least two green samples on either side of a non-green element.

While not necessary for this invention, if the digital filter disclosed in the aforementioned U.S. Pat. No. 4,663,661 is incorporated in the digital processing of the output signal, the optical blurring filter operates vertically rather than horizontally and the digital filter is implemented in the vertical direction rather than the horizontal direction (as shown in the '661 patent), since a trio of green values are arranged vertically on either side of a red or blue value. Calculating a green value for the red or blue location thus involves, e.g., a series of six line delays or their equivalent so that six green values can be accessed at the same time. Such delays and other ancillary processing are provided in the digital processing subsequent to the stage 44 of A/D conversion. In particular, the provision of the memory 50 inherently provides the necessary delays since all the necessary values can be accessed at once.

It is a further feature of the invention that the imaging apparatus can merely have a monochrome replay capability. By this is meant the image monitor can be, for example, a small, pocketable device that is attached to the imaging apparatus as needed. For this reason, FIG. 1 also shows a pair of optional connections 70 and 72 between the switch 52 and the display 54 and the recorder 56, respectively. These connections, which are not a necessary aspect of the preferred embodiment, enhance the portability of the imaging apparatus by allowing the low resolution display 54 and/or the high resolution recorder 56 to be detached from the image-capturing portion of the apparatus. In such a case, the display 54 and/or the recorder 56 would be structurally separate from the imaging apparatus. Moreover, a specially adapted low resolution display, such as a liquid crystal display 74, may be combined with a dedicated processor and memory 76 to form a small, portable low resolution display module 78 that may be connected through a connector 79 to the detached recorder 56 to verify specific images. The operation of the module 78 is directed from a small key pad 80. Like the connectors 70 and 72, the module 78 is not a necessary aspect of the preferred embodiment and would ordinarily be used when the recorder 56 is separated from the rest of the imaging apparatus.

The invention has been described in detail with particular reference to a presently preferred embodiment, but it will be understood that variations and modifications can be effected within the spirit and scope of the invention.

What is claimed is:

1. Imaging apparatus for generating a lower resolution verification image signal from a higher resolution image source, said imaging apparatus comprising:
   an area image sensor having a plurality of light-sensitive areas arranged two-dimensionally in parallel lines each oriented lengthwise in the horizontal high speed scanning direction;

a color filter array having a pattern of at least one line of same-color luminance filter elements oriented in the horizontal scanning direction adjacent to at least one line of chrominance filter elements including at least one other color oriented in the horizontal scanning direction;

means for scanning said image sensor and generating an output signal comprising a plurality of discrete image signals corresponding to the plurality of light-sensitive areas, said output signal comprising a line-separated pattern of luminance image signals and chrominance image signals; and means for generating a low resolution verification image signal from all or a portion of the luminance signals from said lines of same-color luminance filter elements.

2. Apparatus as claimed in claim 1 in which said color filter array comprises a vertically-repetitive pattern of at least one line of green filter elements oriented in the horizontal scanning direction adjacent to at least one line of alternating red and blue filter elements also oriented in the horizontal scanning direction.

3. Apparatus as claimed in claim 1 in which said color filter array comprises a vertically-repetitive pattern of three lines of green filter elements and one line of alternating red and blue filter elements, all oriented in the horizontal scanning direction.

4. Apparatus as claimed in claim 1 further comprising a display device for generating a low resolution verification display from the low resolution verification signal.

5. Apparatus as claimed in claim 4 in which said display device accommodates fewer lines of image than provided by said area image sensor.

6. Apparatus as claimed in claim 5 in which said image sensor comprises a high definition line array of approximately 1000 or more lines and said display device accommodates a standard video rate of approximately 525 lines.

7. Apparatus as claimed in claim 1 further comprising memory means for receiving the output signal generated by said scanning means, said low resolution verification image signal being generated from all or a portion of the luminance image signals stored in said memory means.

8. Imaging apparatus for generating an electrical image of an object, for verifying the appearance of the image and for recording the image, said imaging apparatus comprising:

an area image sensor having a plurality of light-sensitive areas arranged two-dimensionally in parallel lines each oriented lengthwise in the horizontal high speed scanning direction;

a color filter array having a vertically-repetitive pattern of at least one line of same-color filter elements oriented in the horizontal scanning direction and a line of filter elements including at least one other color also oriented in the horizontal scanning direction;

means for scanning said image sensor and generating an output signal comprising a plurality of discrete signals corresponding to the plurality of light-sensitive areas, said output signal comprising a repetitive color video sequence of at least one line of the same color and one line including said other color;

memory means for receiving the output signal and for storing the discrete image signals in line sequence;

means for selectively addressing the memory means in either (A) a high resolution mode or (B) a low resolution mode, said high resolution mode including the addressing of substantially all image signals and said low resolution mode including the addressing of all or fewer image signals from only said lines of same-color filter elements;

means activating said high resolution mode for recording substantially all the discrete image signals stored in said memory means; and means activating said low resolution mode for displaying all or fewer of the image signals of the same color.

9. Apparatus as claimed in claim 8 in which said color filter array includes a vertically-repetitive pattern of three lines of luminance-responsive filter elements and one line of chrominance-responsive filter elements, all oriented in the horizontal scanning direction.

10. Apparatus as claimed in claim 8 further comprising a display device for displaying a low resolution image in response to said low resolution mode.

11. Apparatus as claimed in claim 10 in which said low resolution mode is the standard NTSC video line rate and the high resolution mode is a line rate of approximately 1000 or more lines.

* * * * *